(12) United States Patent
Takeuchi et al.

(10) Patent No.: US 6,873,590 B2
(45) Date of Patent: Mar. 29, 2005

(54) OBJECTIVE LENS FOR OPTICAL PICK-UP

(75) Inventors: Shuichi Takeuchi, Saitama-ken (JP); Koichi Maruyama, Tokyo (JP)

(73) Assignee: PENTAX Corporation, Tokyo (JP)

(*) Notice: Subject to any disclaimer, the term of this patent is extended or adjusted under 35 U.S.C. 154(b) by 370 days.

(21) Appl. No.: 10/087,832

(22) Filed: Mar. 5, 2002

(65) Prior Publication Data

US 2002/0172132 A1 Nov. 21, 2002

(51) Int. Cl.⁷ .................................................. G11B 7/00
(52) U.S. Cl. ............................................. 369/112.08
(58) Field of Search .................... 369/112.01, 112.23, 369/112.08, 112.13, 44.23, 44.24, 94

(56) References Cited

U.S. PATENT DOCUMENTS

| | | | |
|---|---|---|---|
| 5,883,744 A | 3/1999 | Maruyama | |
| 6,088,322 A | 7/2000 | Broome et al. | |
| 6,118,594 A | 9/2000 | Maruyama | |
| 6,191,889 B1 | 2/2001 | Maruyama | |
| 6,344,935 B1 | 2/2002 | Maruyama | |
| 6,667,943 B1 * | 12/2003 | Maruyama et al. | 369/112.08 |

| | | |
|---|---|---|
| 2001/0008513 A1 | 7/2001 | Arai et al. |

FOREIGN PATENT DOCUMENTS

| | | |
|---|---|---|
| EP | 1102251 | 5/2001 |
| JP | 1-338431 | 12/2001 |

* cited by examiner

*Primary Examiner*—Nabil Hindi
(74) *Attorney, Agent, or Firm*—Greenblum & Bernstein, P.L.C.

(57) ABSTRACT

Disclosed is an objective lens of an optical pick-up that converges light beams of two different wavelengths onto recording layers of optical discs of two different recording densities, respectively. The objective lens includes a refractive lens whose one surface is divided into a common area through which a light beam of a low NA, which is necessary and sufficient for an optical disc having low recording density, passes and a high NA exclusive area through which a light beam of a high NA, which is necessary only for an optical disc having high recording density, passes. A diffractive lens structure is formed in both the areas. The diffractive lens structure in the common area maximizes the diffraction efficiency of the first order and that in the high NA exclusive area maximizes the diffraction efficiency of the second or third order at the wavelength corresponding to the optical disc having high recording density.

11 Claims, 7 Drawing Sheets

FIG. 1A  FIG. 1B  FIG. 1C
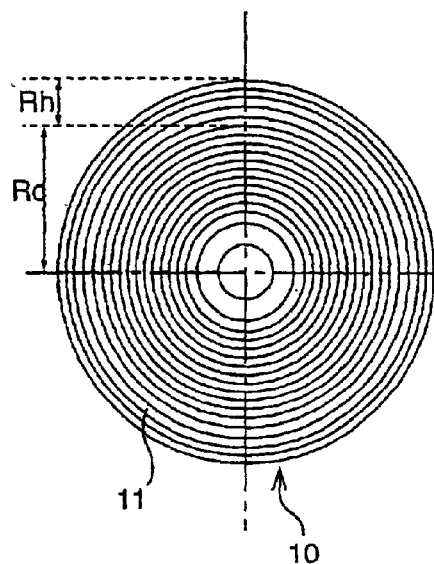
FIG. 2
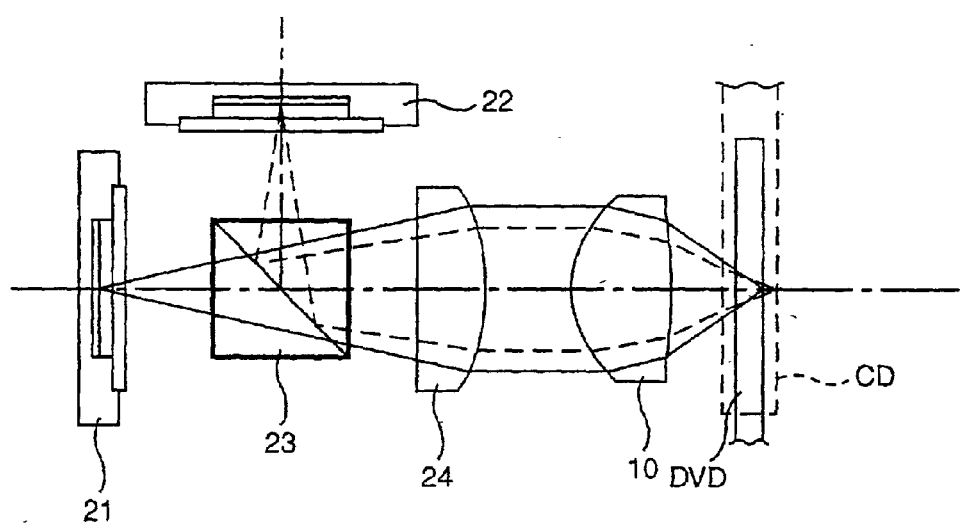

FIG. 3A
FIG. 3B
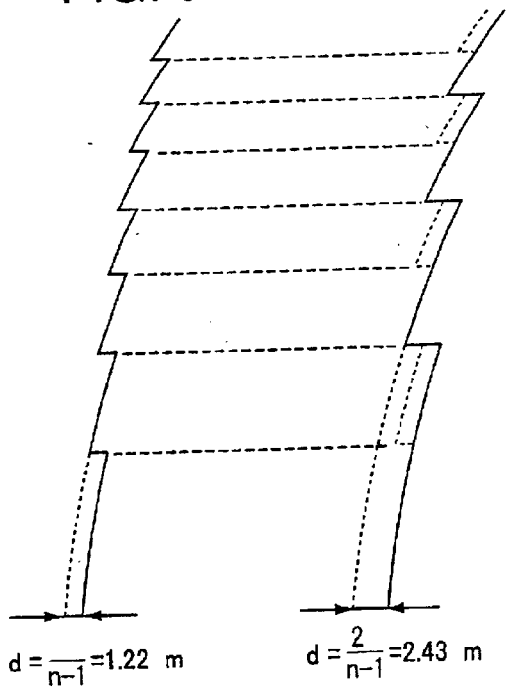
$d = \frac{1}{n-1} = 1.22$ m
$d = \frac{2}{n-1} = 2.43$ m
FIG. 4
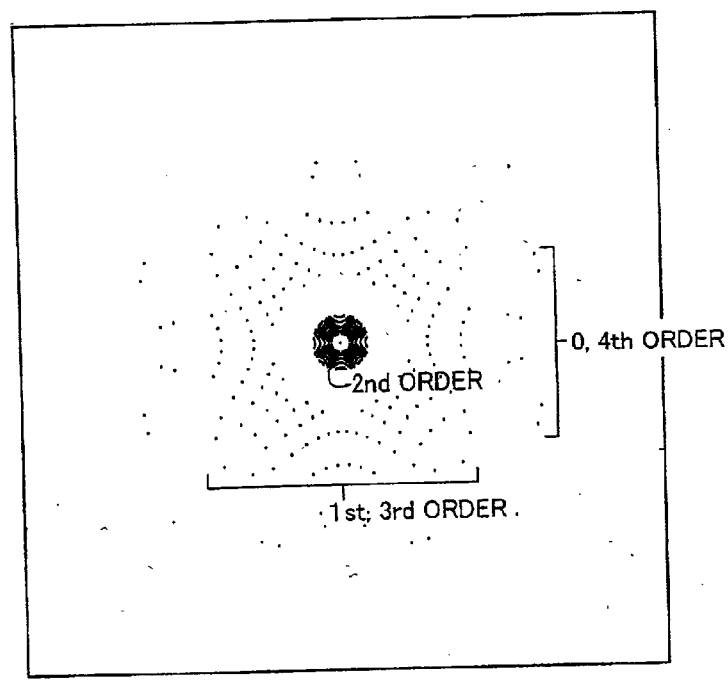
0, 4th ORDER
2nd ORDER
1st, 3rd ORDER

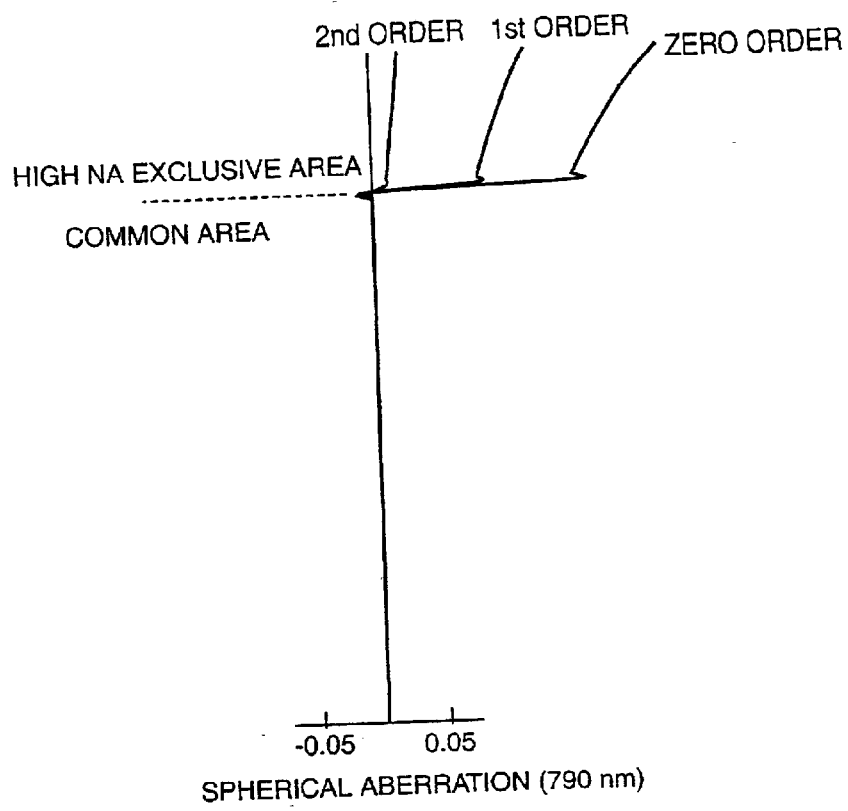
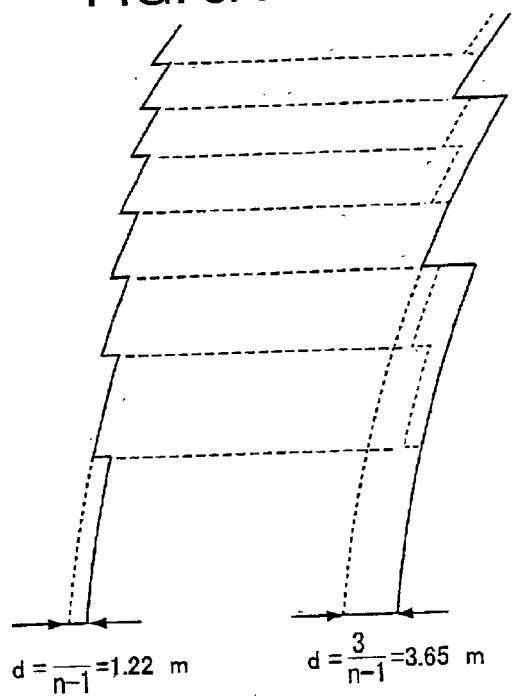

SPHERICAL ABERRATION (790 nm)

OBJECTIVE LENS FOR OPTICAL PICK-UP

BACKGROUND OF THE INVENTION

The present invention relates to an objective lens for an optical pick-up that is capable of using a plurality of kinds of optical discs whose recording densities are different from each other.

In general, diameter of a beam spot formed on a recording layer of an optical disc is closely related to the recording density of the optical disc. That is, the spot diameter is required to have a suitable size for appropriately covering a track on the recording layer in width. The disc with higher recording density has narrower track width, which requires a smaller spot size. On the contrary, the disc with lower recording density has wider track width, which requires a larger spot size.

When the spot diameter is much larger than the track width, reproduced signal may include jitter, which is undesirable effect of the reflected light from adjacent tracks on the reproduced signal. On the other hand, when the spot diameter is much smaller than the track width, particularly for an optical system that reproduces the recorded signal from an optical disc such as a compact disc (CD) through the use of diffraction of light, the system may miss reproducing the signal due to insufficient diffraction.

Since the spot diameter becomes smaller as a wavelength of light becomes shorter and as numerical aperture (NA) becomes larger, the optical system for a digital versatile disc (DVD) with high recording density requires a shorter wavelength and a higher NA, and the optical system for the CD with low recording density requires a longer wavelength and a lower NA. Further, the reflection characteristics of a CD-R (CD recordable) require the laser source whose emission wavelength is longer than 780 nm. Accordingly, the optical pick-up that is capable of using a DVD and a CD-R is needed to provide a light source that has a relatively short emission wavelength about 650 nm and a light source that has a relatively long emission wavelength about 780 nm.

A conventional optical system of the optical pick-up compatible between a CD and a DVD limits the aperture when a CD is used, thereby forming beam spots having suitable size for both a CD and a DVD. An adjustable aperture stop or a dichroic filter is located between the light source and the objective lens to limit the aperture.

However, when an aperture stop or a dichroic filter is installed as a separate element, the number of components is increased, resulting in a disadvantage in size and weight.

SUMMARY OF THE INVENTION

It is therefore an object of the present invention to provide an objective lens for an optical pick-up, which is able to limit an aperture when an optical disc of low recording density is used without employing a separate element such as an aperture stop or a dichroic filter.

For the above object, according to the present invention, there is provided an improved objective lens for an optical pick-up that converges light beams of at least two different wavelengths onto recording layers of optical discs of at least two different recording densities, respectively, which includes a refractive lens whose at least one surface is divided into a common area through which a light beam of a low NA, which is necessary and sufficient for an optical disc having low recording density, passes and a high NA exclusive area through which a light beam of a high NA, which is necessary only for an optical disc having high recording density, passes, wherein a diffractive lens structure having a plurality of concentric ring areas with minute steps at the boundaries therebetween is formed in at least the high NA exclusive area, and the diffractive lens structure formed in the high NA exclusive area is designed to maximize the diffraction efficiency of second or higher diffraction light at the wavelength corresponding to the optical disc having high recording density.

With this construction, when the optical disc having high recording density is used, the working order (high order) diffracted light diffracted by the high NA exclusive area is effectively converged onto the recording layer of the optical disc together with the light beam passing through the common area and thereby forms a beam spot having a relatively small diameter. On the other hand, when the optical disc having low recording density is used, while the light beam passing through the common area is converged onto the recording layer, the light beam incident on the high NA exclusive area is diffused because the light amount is distributed among a plurality of diffraction orders. Therefore, the aperture of the lens is substantially limited and thereby forms a beam spot having a relatively large diameter.

Incidentally, when the unnecessary light, which is light diffracted by the high NA exclusive area when the optical disc having low recording density is used, is converged near the beam spot, reproduced signal includes the jitter and tracking error signal by the three-beam method including noise. The unnecessary light of the working diffraction order is converged near the beam spot and it should be attenuated to reduce the jitter and the noise. On the other hand, the unnecessary light of the different order from the working diffraction order has different convergence from that of the working diffraction order, and is diffused on the recording layer of the optical disc.

The working diffraction order is defined as the diffraction order of which the diffraction efficiency of the diffractive lens structure in the high NA exclusive area is maximized at the wavelength corresponding to the optical disc having high recording density.

According to the invention, when an optical disc having low recording density is used, since the unnecessary light is distributed among a plurality of diffraction orders, the intensity of the diffracted light of the working order is lowered, which reduces the jitter and the noise.

The common area may be formed as a diffractive surface having a diffractive lens structure or a continuous surface without having a diffractive lens structure.

When the common area has the diffractive lens structure, the diffractive lens structure formed in the common area is designed to maximize the diffraction efficiency of the same order for the light beams of the at least two wavelengths.

Further, at the wavelength corresponding to the optical disc having high recording density, the diffraction order where the diffraction efficiency of the diffractive lens structure formed in the high NA exclusive area is maximized is preferably larger than the diffraction order where the diffraction efficiency of the diffractive lens structure formed in the common area is maximized.

For instance, the diffractive lens structure formed in the common area may maximize the diffraction efficiency of the first order diffracted light, and the diffractive lens structure formed in the high NA exclusive area may maximize the diffraction efficiency of the second or higher order diffracted light.

The blaze wavelength of the diffractive lens structure formed in the high NA exclusive area may be shorter than the wavelength of the light beam corresponding to the optical disc having high recording density. With this construction, while the diffraction efficiency at the wavelength corresponding to the optical disc having high recording density is slightly lowered, the diffraction efficiency at the wavelength corresponding to the optical disc having low recording density is significantly lowered, which is more effective to diffuse the unnecessary light.

According to another aspect of the present invention, the object lens includes a refractive lens whose at least one surface is divided into the common area and the high NA exclusive area, wherein the diffractive lens structure is formed in the common area and the high NA exclusive area, and wherein the diffractive lens structure formed in the high NA exclusive area is designed such that the diffraction order where the diffraction efficiency is maximized at the wavelength corresponding to the optical disc having high recording density is different from the diffraction order where the diffraction efficiency is maximized at the wavelength corresponding to the optical disc having low recording density.

The diffraction order where the diffraction efficiency is maximized at the wavelength corresponding to the optical disc having high recording density is preferably higher than the diffraction order where the diffraction efficiency is maximized at the wavelength corresponding to the optical disc having low recording density.

For instance, the diffraction order where the diffraction efficiency may be maximized at the wavelength corresponding to the optical disc having high recording density may be third order and the diffraction order where the diffraction efficiency is maximized at the wavelength corresponding to the optical disc having low recording density is second order.

DESCRIPTION OF THE ACCOMPANYING DRAWINGS

FIGS. 1A, 1B and 1C are a front view, a vertical cross-sectional view and an enlarged view of an objective lens of a first embodiment, respectively;

FIG. 2 shows an optical system of the optical pick-up that employs the objective lens of FIG. 1A;

FIGS. 3A and 3B are enlarged sectional views of the diffractive lens structures in high NA exclusive areas of the objective lenses, FIG. 3A shows a first comparative example and FIG. 3B shows the first embodiment;

FIG. 4 is a spot diagram on the recording layer of the optical disc when the light beam at a wavelength of 790 nm is incident on the objective lens of the first embodiment;

FIG. 5 is a graph showing spherical aberration when the light beam at a wavelength of 790 nm is incident on the objective lens of the first embodiment;

FIGS. 6A and 6B are enlarged sectional views of the diffractive lens structures in high NA exclusive areas of the objective lenses, FIG. 6A shows a first comparative example and FIG. 6B shows the second embodiment;

DESCRIPTION OF THE EMBODIMENTS

Figure 7:
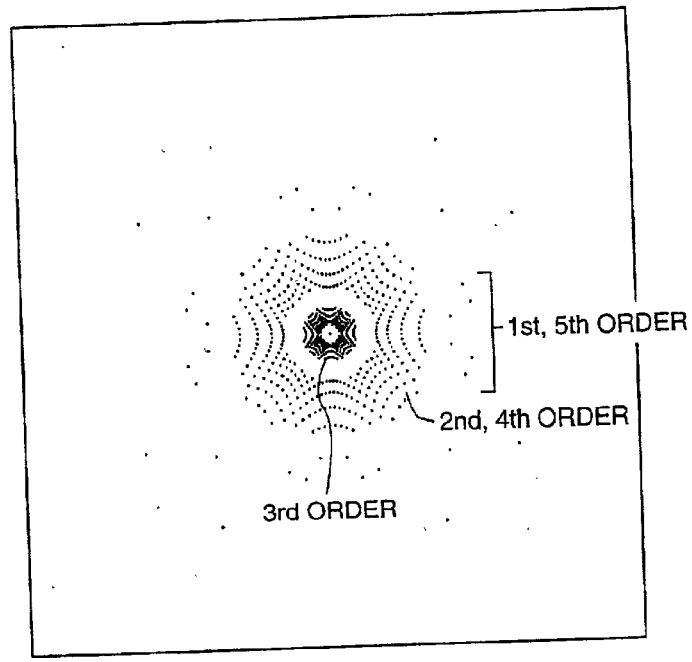
FIG. 7 is a spot diagram on the recording layer of the optical disc when the light beam at a wavelength of 790 nm is incident on the objective lens of the second embodiment.

Three embodiments of an objective lens according to the present invention and two comparative examples will be described hereinafter. The objective lenses of the embodiments and the comparative examples are employed in an optical pick-up of an optical disc apparatus, which is compatible among a CD, a CD-R and a DVD, for converging a laser beam emitted from a laser source onto a recording layer of an optical disc.

First Embodiment

FIGS. 1A, 1B and 1C show an objective lens 10 of an optical pick-up according to a first embodiment: FIG. 1A is a front view; FIG. 1B is a vertical cross-sectional view; and FIG. 1C is an enlarged view of FIG. 1B.

The objective lens 10 is a biconvex plastic lens having first and second aspherical surfaces 11 and 12. The first surface 11 of the objective lens 10 is divided into a common area Rc through which a light beam of a low NA, which is necessary and sufficient for an optical disc having low recording density such as a CD or a CD-R, passes and a high NA exclusive area Rh through which a light beam of a high NA, which is necessary only for an optical disc having high recording density such as a DVD, passes. The common area Rc is inside of the circle where a light beam whose NA is about 0.45 through 0.50 passes, and the high NA exclusive area Rh surrounds the common area Rc.

A diffractive lens structure having a plurality of concentric ring areas is formed over the entire area including the common area Rc and the high NA exclusive area Rh of the first surface 11 as shown in FIG. 1A. The diffractive lens structure has minute steps in an optical axis direction at the boundaries between the adjacent ring areas as shown in FIG. 1C. The second surface 12 is formed as a continuous surface without steps.

FIG. 2 shows an optical system of the optical pick-up that employs the objective lens 10 of the first embodiment. The optical system of the optical pick-up includes a DVD module 21, a CD module 22, a beam combiner 23, a collimator lens 24 and the objective lens 10. Each of the modules 21 and 22 is provided with a semiconductor laser and a sensor that are mounted on a common substrate. The objective lens 10 is driven in the optical axis direction and in the radial direction of the optical disc by means of well-known focusing and tracking mechanisms.

The DVD has higher recording density and the thickness of the cover layer thereof is 0.6 mm. In order to form a fine beam spot on a DVD, the semiconductor laser of the DVD module 21 emits the laser beam at a wavelength of 657 nm.

On the other hand, a CD-R and a CD have lower recording density and the thickness of the cover layer is 1.2 mm. Since a CD or a CD-R requires a relatively larger beam spot and a CD-R requires near-infrared radiation due to its spectral reflectance, the semiconductor laser of the CD module 22 emits the laser beam at a wavelength of 790 nm.

When the DVD (shown by a solid line) is used, the DVD module 21 is operated to emit the laser beam at a wavelength of 657 nm (shown by a solid line). The laser beam is converged onto the recording layer of the DVD through its cover layer.

When the CD (shown by a dotted line) is used, the CD module 22 is operated to emit the laser beam at a wavelength of 790 nm (shown by a dotted line). The laser beam is converged onto the recording layer of the CD through its cover layer.

The reflected laser beam from each of the optical discs is received by photodetectors provided in each of the modules. A focusing error signal and a tracking error signal are produced by the output from the photodetectors. Further, a reproducing signal of recorded data is also produced during reproducing.

The diffractive lens structure formed in the common area Rc of the first surface 11 maximizes the diffraction efficiency of the same order (a first order) diffracted light at a plurality of wavelengths of 657 nm and 790 nm. Further, the diffractive lens structure formed in the common area Rc has a wavelength dependence of a spherical aberration such that the spherical aberration is corrected for a DVD having the cover layer of 0.6 mm at a wavelength of 657 nm and for a CD or a CD-R having the cover layer of 1.2 mm at a wavelength of 790 nm. Namely, the diffractive lens structure in the common area RC has such a wavelength dependence that the spherical aberration varies in the undercorrected direction as the wavelength increases.

The spherical aberration varies in the overcorrected direction as the thickness of the cover layer increases. On the other hand, a shorter wavelength laser beam is used for a DVD having a thinner cover layer and a longer wavelength laser beam is used for a CD or a CD-R having a thicker cover layer. Therefore, since the diffractive lens structure in the common area RC changes the spherical aberration in the undercorrected direction as the wavelength of the incident laser beam increases as described above, the change of the spherical aberration due to a change of the cover layer's thickness is counterbalanced by the change of the spherical aberration due to the wavelength dependence of the diffractive lens structure.

The diffractive lens structure formed in the high NA exclusive area Rh is designed such that the diffraction efficiency of the second order diffracted light is maximized at the wavelength corresponding to a DVD having higher recording density. The diffractive lens structure in the high NA exclusive area Rh according to the first embodiment is shown in FIG. 3B in comparison with that of the first comparative example shown in FIG. 3A. That is, FIG. 3A shows the diffractive lens structure of the first comparative example to maximize the first order diffracted light and FIG. 3B shows the diffractive lens structure of the first embodiment to maximize the second order diffracted light.

In order to maximize the diffraction efficiency of a k-th order diffracted light, the step between adjacent ring areas of the diffractive lens structure should be equal to $k\lambda/(n-1)$, where $\lambda$ is a wavelength and n is refractive index. In the first comparative example, the step d between adjacent ring areas is equal to $\lambda/(n-1)=1.22\ \mu m$, and that of the first embodiment is equal to $2\lambda/(n-1)=2.43\ \mu m$.

The following TABLE 1 shows the refractive indexes of the objective lens 10 of the first embodiment, optical path difference ratios and diffraction efficiencies of the diffractive lens structure formed in the high NA exclusive area from zero order to tenth order, at wavelengths of 657 nm used for a DVD and 790 nm used for a CD or a CD-R, respectively. The diffraction efficiency $\eta_k$ of a k-th order diffracted light is given by the following equation.

$$\eta_k = \sin c^2(\alpha-k)$$

$$\alpha = [\lambda_0\{n-1\}]/[\lambda\{n_0-1\}]$$

Where $\lambda_0$ is a blaze wavelength, $\lambda$ is a working wavelength, $n_0$ is refractive index at the blaze wavelength, n is refractive index at the working wavelength and sinc (x) is a special function represented by $\sin(\pi x)/\pi x$.

The optical path difference ratio is defined as a ratio of an optical path difference caused by the step between adjacent ring areas to the working wavelength, and it is given by $(n-1)d/\lambda$. The smaller the difference between the ratio and the closest integer is, the larger the light amount distributed to the diffraction order of the closest integer.

TABLE 1

| Wavelength | 657 nm | 790 nm |
| --- | --- | --- |
| Refractive index | 1.54056 | 1.53653 |
| Optical path difference ratio | 1.999 | 1.650 |
| Diffraction efficiency | | |
| Zero order | 0.0000 | 0.0295 |
| 1st order | 0.0000 | 0.1900 |
| 2nd order | 1.0000 | 0.6572 |
| 3rd order | 0.0000 | 0.0441 |
| 4th order | 0.0000 | 0.0146 |
| 5th order | 0.0000 | 0.0072 |
| 6th order | 0.0000 | 0.0042 |
| 7th order | 0.0000 | 0.0028 |
| 8th order | 0.0000 | 0.0020 |
| 9th order | 0.0000 | 0.0015 |
| 10th order | 0.0000 | 0.0012 |
| Total | 1.0000 | 0.9542 |

In the first embodiment, since the diffraction efficiency of the second order (the working order) diffracted light is 100% at a wavelength of 657 nm, the light beam passing through the high NA exclusive area Rh is effectively converged onto the recording layer of the DVD together with the light beam passing through the common area Rc. Further, since the optical path difference ratio is far from the closest integer "2" at a wavelength of 790 nm, the diffraction efficiency of the second order diffracted light as the working order is lowered to 66% and the remaining light amount is distributed to the other order diffracted light whose convergence is different from the working order diffracted light. Accordingly, the light amount of the unnecessary light of the working diffraction order that is converged near the beam spot is relatively small, which adequately diffuses the unnecessary light on the recording layer.

FIG. 4 is a spot diagram on the recording layer of the optical disc when the laser beam at a wavelength of 790 nm is incident on the objective lens 10 of the first embodiment. The density of dots corresponds to light amount. Further, FIG. 5 is a graph showing spherical aberration in this case. Since the light beam passing through the common area Rc is corrected for the spherical aberration, it forms a high-intensity beam spot at the center. The unnecessary light passing through the high NA exclusive area Rh is mainly distributed among second order, first order and zero order diffracted lights, and these lights reach respective positions because the spherical aberration varies according to the diffraction order. That is, the second order diffracted light that is 66% of the unnecessary light is distributed around the beam spot to form a ring. The first and third order diffracted lights are diffused around the ring of the second order diffracted light and the zero and fourth order diffracted lights are diffused around the first and third order diffracted lights.

First Comparative Example

A first comparative example has about the same construction as the first embodiment. That is, one lens surface of a single lens having both aspherical surfaces is divided into the common area and the high NA exclusive area, and the diffractive lens structure is formed over the entire area of the lens surface including the common area and the high NA exclusive area. The diffractive lens structure in the common area has such wavelength dependence that the first order diffracted lights at two wavelengths are converged onto the recording layers of CD and DVD, respectively. On the other hand, a difference from the first embodiment is that the diffractive lens structure in the high NA exclusive area maximizes the diffraction efficiency of the first order diffracted light at a wavelength of 657 nm corresponding to a DVD. The following TABLE 2 shows the refractive indexes and the diffraction efficiencies of the diffractive lens structure formed in the high NA exclusive area of the objective lens according to the first comparative example.

TABLE 2

| Wavelength | 657 nm | 790 nm |
|---|---|---|
| Refractive index | 1.54056 | 1.53653 |
| Optical path difference ratio | 1.000 | 0.825 |
| Diffraction efficiency | | |
| Zero order | 0.0000 | 0.0406 |
| 1st order | 1.0000 | 0.9034 |
| 2nd order | 0.0000 | 0.0200 |
| 3rd order | 0.0000 | 0.0058 |
| 4th order | 0.0000 | 0.0027 |
| 5th order | 0.0000 | 0.0016 |
| 6th order | 0.0000 | 0.0010 |
| 7th order | 0.0000 | 0.0007 |
| 8th order | 0.0000 | 0.0005 |
| 9th order | 0.0000 | 0.0004 |
| 10th order | 0.0000 | 0.0003 |
| Total | 1.0000 | 0.9772 |

In the first comparative example, since the diffraction efficiency of the first order (the working order) diffracted light is 100% at a wavelength of 657 nm, the light beam passing through the high NA exclusive area Rh is effectively converged onto the recording layer of the DVD together with the light beam passing through the common area Rc. However, since the optical path difference ratio is close to the closest integer "1" at a wavelength of 790 nm, the diffraction efficiency of the first order diffracted light as the working order becomes 90% or more at a wavelength of 790nm, the unnecessary light having relatively high intensity converges into a ring area near the beam spot when a CD is used.

Figure 13:
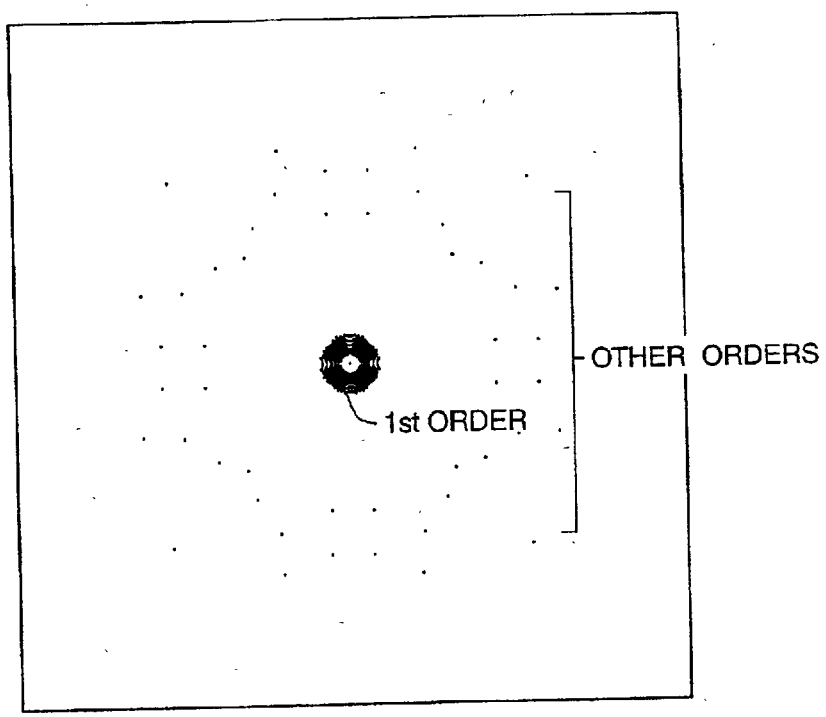
FIG. 13 is a spot diagram on the recording layer of the optical disc when the light beam at a wavelength of 790 nm is incident on the objective lens of the first comparative example.

FIG. 13 is a spot diagram on the recording layer of the optical disc when the laser beam at a wavelength of 790 nm is incident on the objective lens of the first comparative example. The light beam passing through the common area Rc forms a high-intensity beam spot at the center. On the other hand, the unnecessary light passing through the high NA exclusive area Rh is not adequately diffused and 90% or more of the unnecessary light is distributed in a ring area around the beam spot as the first order diffracted light.

Further, when the objective lens of the first comparative example is employed, the unnecessary light having relatively large intensity is distributed near the beam spot as flare on a sensor of the CD module, which causes noise in the tracking error signal when the three-beam method is adopted. In the three-beam method, the light beam incident on the optical disc is divided into a main (center) beam and a pair of auxiliary (side) beams, the sensor unit consists of a main sensor that receives the reflected main beam and a pair of auxiliary sensors that are located at both sides of the main sensor and receive the reflected auxiliary beams. Since the auxiliary sensors are close to the main sensor, the flare of the main beam is received by the auxiliary sensors, which causes noise in the tracking error signal that is produced by subtracting the outputs of the auxiliary sensors.

Even if the diffractive lens structure in the high NA exclusive area is designed such that the diffraction efficiency of the first order diffracted light is maximized as the first comparative example, it is possible to diffuse the unnecessary light passing through the high NA exclusive area during the reproduction of a CD by increasing spherical aberration at a wavelength corresponding to a CD through the use of the wavelength dependence of the diffractive lens structure. However, the increasing of spherical aberration for a CD restricts the tolerance to the wavelength corresponding to a DVD, which requires a precise selection of a light source.

According to the first embodiment, the unnecessary light at a wavelength of 790 nm passing through the high NA exclusive area is adequately diffused as compared with the first comparative example shown in FIG. 13. Therefore, the jitter and the noise in the tracking error signal by the three-beam method are reduced even if the spherical aberration of the high NA exclusive area for a CD is small.

Second Embodiment

An objective lens of the second embodiment is a plastic single lens having both aspherical surfaces similar to the first embodiment shown in FIG. 1. The one surface is divided into the common area Rc and the high NA exclusive area Rh. A diffractive lens structure is formed over the two areas Rc and Rh.

The diffractive lens structure formed in the common area Rc maximizes the diffraction efficiency of the first order diffracted light at wavelengths of 657 nm and 790 nm.

The diffractive lens structure formed in the high NA exclusive area Rh is designed such that the diffraction efficiency of the third order diffracted light is maximized at a wavelength of 657 nm corresponding to a DVD having higher recording density.

The diffractive lens structure in the high NA exclusive area Rh according to the second embodiment is shown in FIG. 6B in comparison with that of the first comparative example shown in FIG. 6A. That is, FIG. 6A shows the diffractive lens structure of the first comparative example to maximize the first order diffracted light and FIG. 6B shows the diffractive lens structure of the second embodiment to maximize the third order diffracted light. The step d between adjacent ring areas of the second embodiment is equal to $3\lambda(n-1)=3.65$ μm. The data of the objective lens of the second embodiment are shown in TABLE 3.

TABLE 3

| Wavelength | 657 nm | 790 nm |
|---|---|---|
| Refractive index | 1.54056 | 1.53653 |
| Optical path difference ratio | 2.999 | 2.476 |
| Diffraction efficiency | | |
| Zero order | 0.0000 | 0.0164 |
| 1st order | 0.0000 | 0.0463 |
| 2nd order | 0.0000 | 0.4455 |
| 3rd order | 1.0000 | 0.3661 |
| 4th order | 0.0000 | 0.0433 |

TABLE 3-continued

| Wavelength | 657 nm | 790 nm |
|---|---|---|
| 5th order | 0.0000 | 0.0158 |
| 6th order | 0.0000 | 0.0081 |
| 7th order | 0.0000 | 0.0049 |
| 8th order | 0.0000 | 0.0033 |
| 9th order | 0.0000 | 0.0024 |
| 10th order | 0.0000 | 0.0018 |
| Total | 1.0000 | 0.9539 |

In the second embodiment, since the diffraction efficiency of the third order (the working order) diffracted light is 100% at a wavelength of 657 nm, the light beam passing through the high NA exclusive area Rh is effectively converged onto the recording layer of the DVD together with the light beam passing through the common area Rc. Further, since the integer closest to the optical path difference ratio at a wavelength of 790 nm is "2", the diffraction efficiency of the second order diffracted light that is different from the working order is maximized, the diffraction efficiency of the third order diffracted light is lowered to 37%. Accordingly, the light amount of the unnecessary light of the working diffraction order is relatively small, which adequately diffuses the unnecessary light on the recording layer.

Figure 8:
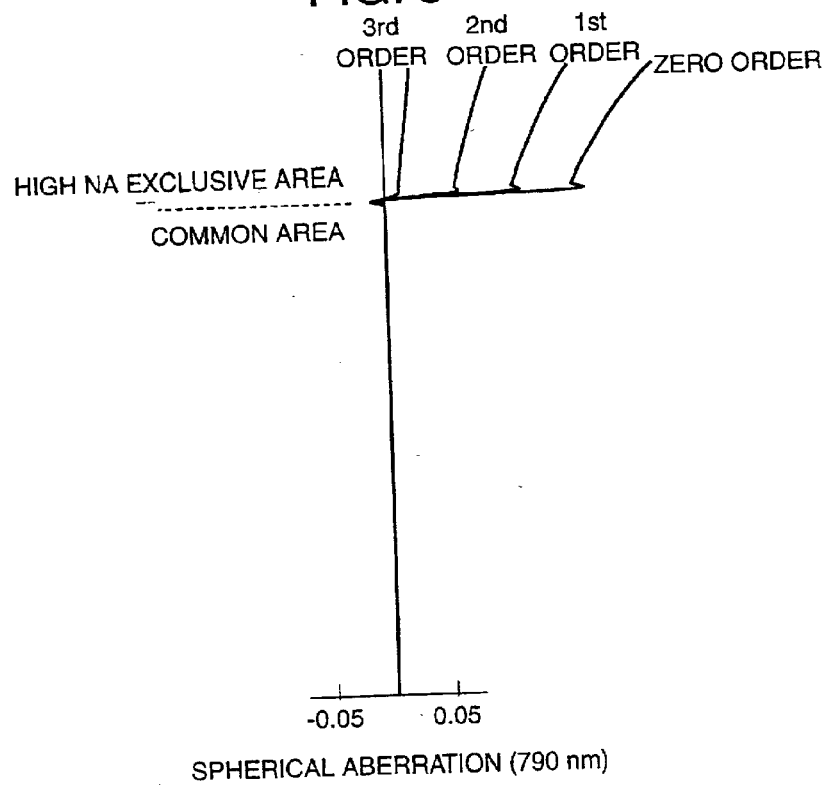
FIG. 8 is a graph showing spherical aberration when the light beam at a wavelength of 790 nm is incident on the objective lens of the second embodiment.

FIG. 7 is a spot diagram on the recording layer of the optical disc when the laser beam at a wavelength of 790 nm is incident on the objective lens of the second embodiment. FIG. 8 is a graph showing spherical aberration in this case.

Since the light beam passing through the common area Rc is corrected in the spherical aberration, it forms a high-intensity beam spot at the center. The unnecessary light passing through the high NA exclusive area Rh is mainly distributed among first to fourth order diffracted lights, and these lights reach respective positions because the spherical aberration varies according to the diffraction order. That is, the third order diffracted light that is 37% of the unnecessary light is distributed around the beam spot to form a ring. The second and fourth order diffracted lights are diffused around the ring of the third order diffracted light and the first and fifth order diffracted lights are diffused around the second and fourth order diffracted lights. Thus the unnecessary light at a wavelength of 790 nm passing through the high NA exclusive area is adequately diffused as compared with the first comparative example shown in FIG. 13.

Figure 9:
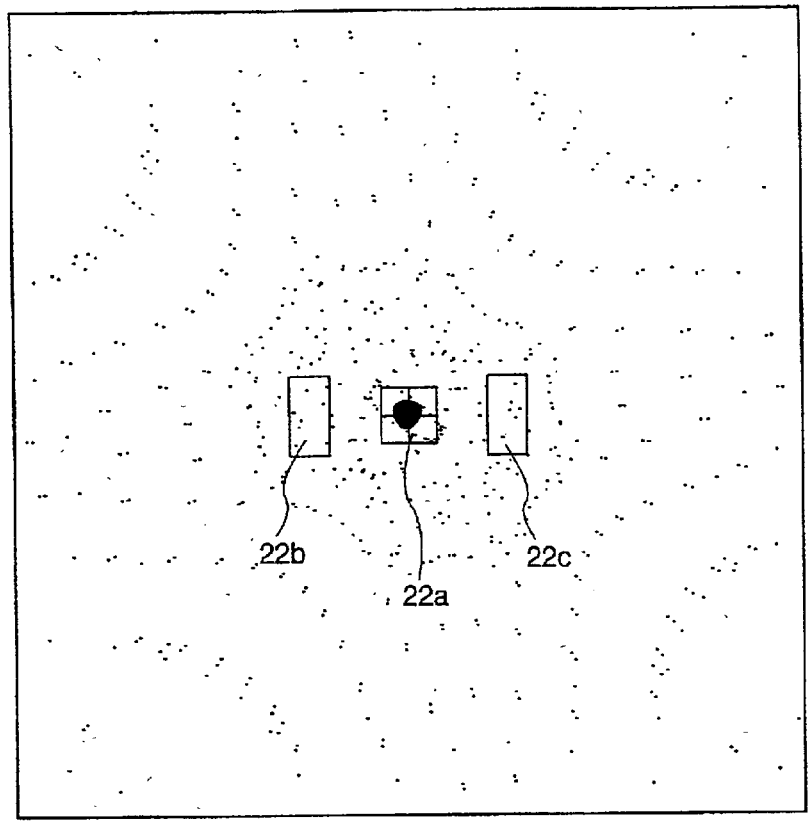
FIG. 9 is a spot diagram on the sensor surface when the light beam at a wavelength of 790 nm is incident on the objective lens of the second embodiment.

FIG. 9 is a spot diagram on the sensor plate of the CD module 22 when the light beam at a wavelength of 790 nm is incident on the objective lens of the second embodiment. The sensor plate is designed for the three-beam method as detection of the tracking error signal. The sensor plate is provided with a four-part (2×2) split main sensor 22a at the center and a pair of tracking error detecting sensors 22b and 22c that are located on both sides of the four-part split main sensor 22a. In the three-beam method, the laser beam is divided into the main beam having high intensity and two auxiliary beams having low intensity. FIG. 9 shows the diffusion of the main beam on the sensor plate.

The four-part split main sensor 22a receives the main beam reflected from the optical disc. A focusing error signal and a data signal are calculated based on the outputs from the four parts of the sensor 22a. The focusing error signal is detected by the astigmatism method. The tracking error detecting sensors 22b and 22c receive the auxiliary beams, respectively, and the tracking error signal is obtained by subtracting the outputs of the respective tracking error detecting sensors.

When the diffraction efficiency of the working diffraction order of the unnecessary light at the wavelength corresponding to a CD passing through the high NA exclusive area is relatively large as shown in the first comparative example, the flare of the main beam is not adequately diffused. Therefore the tracking error detecting sensors 22b and 22c receive the flare having relatively high intensity, which may cause noise in the tracking error signal.

On the other hand, when the objective lens of the second embodiment is employed, the flare of the main beam is adequately diffused as shown in FIG. 9. Therefore, if a part of the flare is incident on the tracking error detecting sensors 22b and 22c, the flare has little effect on the tracking error signal, which prevents causing noise in the tracking error signal.

Third Embodiment

Figure 10A:
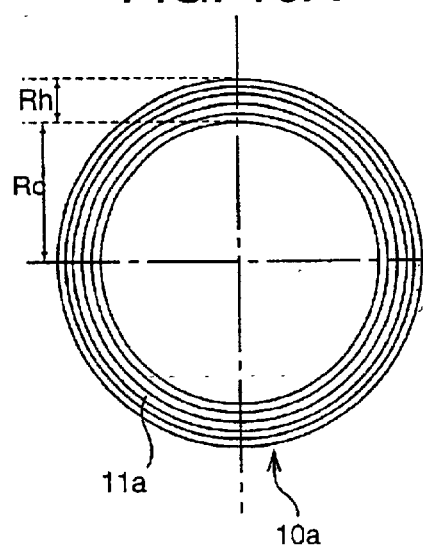
FIGS. 10A, 10B and 10C are a front view, a vertical cross-sectional view and an enlarged view of an objective lens of a third embodiment, respectively.
Figures 10B, 10C:
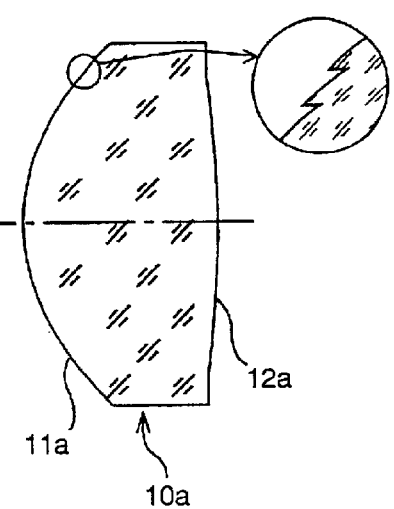

FIGS. 10A, 10B and 10C are a front view, a vertical cross-sectional view and an enlarged view of an objective lens 10a of a third embodiment, respectively. This objective lens 10a is a plastic single lens having both aspherical surfaces 11a and 12a, similar to the first embodiment. The one surface 11a is divided into the common area Rc and the high NA exclusive area Rh.

A diffractive lens structure having a plurality of concentric ring areas is formed in the high NA exclusive area Rh. The common area Rc is formed as a continuous surface without having a diffractive lens structure.

The diffractive lens structure formed in the high NA exclusive area Rh is designed such that the diffraction efficiency of the third order diffracted light is maximized at a wavelength of 657 nm corresponding to a DVD having higher recording density.

The diffraction efficiencies of the diffractive lens structure in the high NA exclusive area at wavelengths of 657 nm and 790 nm are identical with that of the second embodiment shown in TABLE 3. Since the diffraction efficiency of the third order diffracted light is 100% at a wavelength of 657 nm, the light beam passing through the high NA exclusive area Rh is effectively converged onto the recording layer of the DVD together with the light beam passing through the common area Rc. Further, since the diffraction efficiency of the second order is maximized at a wavelength of 790 nm, the diffraction efficiency of the third order (the working order) diffracted light is lowered to 37%. Accordingly, the light amount of the unnecessary light of the working diffraction order is relatively small, which adequately diffuses the unnecessary light on the recording layer.

Figure 11:
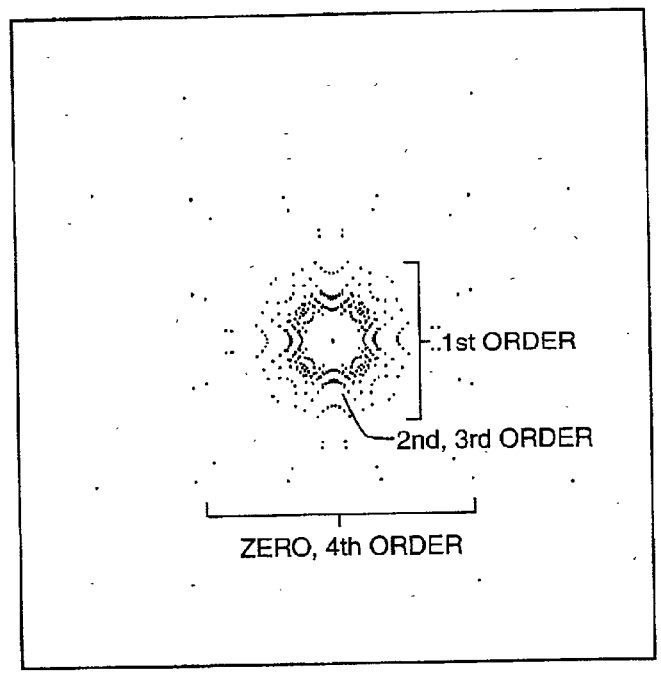
FIG. 11 is a spot diagram on the recording layer of the optical disc when the light beam at a wavelength of 790 nm is incident on the objective lens of the third embodiment.
Figure 12:
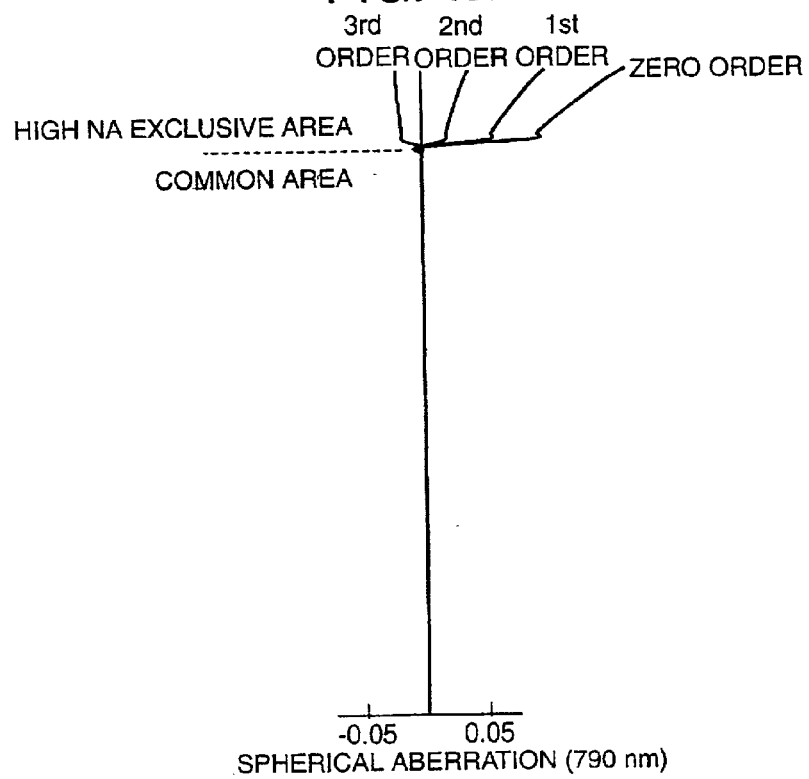
FIG. 12 is a graph showing spherical aberration when the light beam at a wavelength of 790 nm is incident on the objective lens of the third embodiment.

FIG. 11 is a spot diagram on the recording layer of the optical disc when the laser beam at a wavelength of 790 nm is incident on the objective lens 10a of the third embodiment. FIG. 12 is a graph showing spherical aberration in this case.

Since the light beam passing through the common area Rc is corrected in the spherical aberration, it forms a high-intensity beam spot at the center. The unnecessary light passing through the high NA exclusive area Rh is mainly distributed among first to fourth order diffracted lights, and these light beams reach respective positions because the spherical aberration varies according to the diffraction order. That is, the third order diffracted light that is 37% of the unnecessary light is distributed around the beam spot to form a ring. The second and fourth order diffracted lights are diffused around the ring of the third order diffracted light and the first and fifth order diffracted lights are diffused around the second and fourth order diffracted lights.

Second Comparative Example

A second comparative example has about the same construction as the third embodiment except the structure of the high NA exclusive area. That is, one lens surface of a single lens having both aspherical surfaces is divided into the common area and the high NA exclusive area, and the diffractive lens structure is formed in the high NA exclusive area only. The common area is formed as a continuous surface without a diffractive lens structure. On the other hand, a difference from the third embodiment is that the diffractive lens structure in the high NA exclusive area maximizes the diffraction efficiency of the first order diffracted light at a wavelength of 657 nm corresponding to a DVD.

Figure 14:
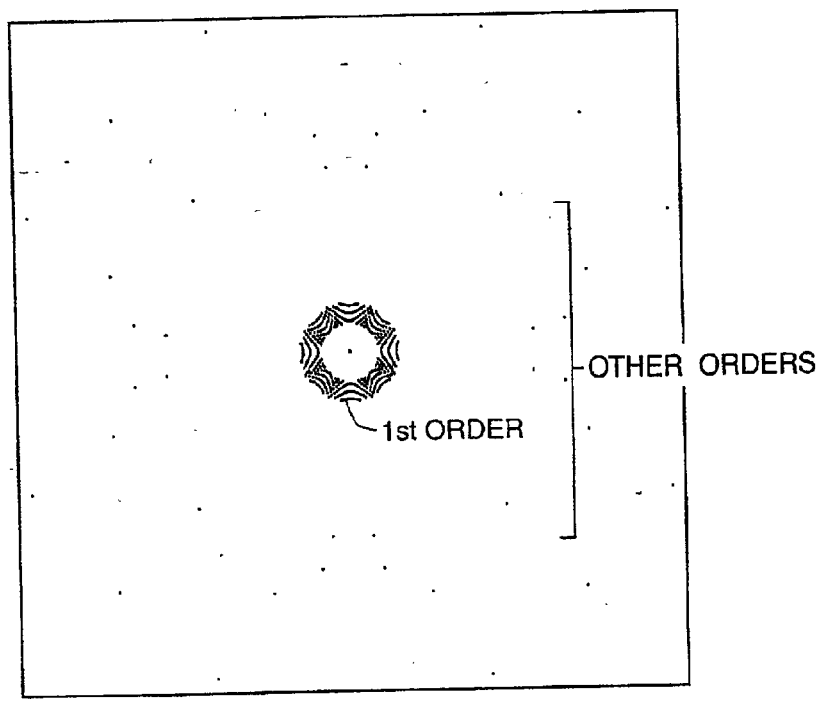
FIG. 14 is a spot diagram on the recording layer of the optical disc when the light beam at a wavelength of 790 nm is incident on the objective lens of a second comparative example.

FIG. 14 is a spot diagram on the recording layer of the optical disc when the laser beam at a wavelength of 790 nm is incident on the objective lens of the second comparative example. The unnecessary light passing through the high NA exclusive area Rh is not adequately diffused and 90% or more of the unnecessary light is distributed in a ring area around the beam spot as the first order diffracted light.

According to the third embodiment, the unnecessary light at a wavelength of 790 nm passing through the high NA exclusive area is adequately diffused as compared with the second comparative example shown in FIG. 14. Therefore, the jitter and the noise in the tracking error signal by the three-beam method are reduced even if the spherical aberration of the high NA exclusive area for a CD is small.

As described above, according to the invention, the aperture of an objective lens can be limited without employing an aperture stop or a dichroic filter. Further, when the optical disc having low recording density is used, the diffraction efficiency of the unnecessary light passing through the high NA exclusive area at the working diffraction order is lowered, the unnecessary light can be adequately diffused even if spherical aberration of the diffractive lens structure in the high NA exclusive area at the wavelength corresponding to the optical disc having low recording density is small. Accordingly, jitter and noise in tracking error signal by the three-beam method are reduced without narrowing tolerance to an emission wavelength of a light source.

The present disclosure relates to the subject matter contained in Japanese Patent Application No. 2001-067319, filed on Mar. 9, 2001, which is expressly incorporated herein by reference in its entirety.

What is claimed is:

1. An objective lens for an optical pick-up that converges light beams of at least two different wavelengths onto recording layers of optical discs of at least two different recording densities, respectively, said objective lens comprising:

a refractive lens whose at least one surface is divided into a common area through which a light beam of a low NA, which is necessary and sufficient for an optical disc having low recording density, passes and a high NA exclusive area through which a light beam of a high NA, which is necessary only for an optical disc having high recording density, passes, wherein a diffractive lens structure having a plurality of concentric ring areas with minute steps at the boundaries therebetween is formed in at least said high NA exclusive area, said diffractive lens structure formed in said high NA exclusive area is designed to maximize the diffraction efficiency of second or higher diffraction light at the wavelength corresponding to said optical disc having high recording density.

2. The objective lens according to claim 1, wherein a diffractive lens structure having a plurality of concentric ring areas with minute steps at the boundaries therebetween is formed in said common area, and said diffractive lens structure formed in said common area maximizes the diffraction efficiency of the same order for said light beams of said at least two wavelengths.

3. The objective lens according to claim 1, wherein the diffraction order where the diffraction efficiency of the diffractive lens structure formed in said high NA exclusive area is maximized is larger than the diffraction order where the diffraction efficiency of said diffractive lens structure formed in said common area is maximized at the wavelength corresponding to said optical disc having high recording density.

4. The objective lens according to claim 3, wherein said diffractive lens structure formed in said common area maximizes the diffraction efficiency of the first order diffracted light.

5. The objective lens according to claim 1, wherein said common area is formed as a continuous surface without having a diffractive lens structure.

6. The objective lens according to claim 1, wherein the blaze wavelength of said diffractive lens structure formed in said high NA exclusive area is shorter than the wavelength of the light beam corresponding to said optical disc having high recording density.

7. An objective lens for an optical pick-up that converges light beams of at least two different wavelengths onto recording layers of optical discs of at least two different recording densities, respectively, said objective lens comprising:

a refractive lens whose at least one surface is divided into a common area through which a light beam of a low NA, which is necessary and sufficient for an optical disc having low recording density, passes and a high NA exclusive area through which a light beam of a high NA, which is necessary only for an optical disc having high recording density, passes, wherein a diffractive lens structure having a plurality of concentric ring areas with minute steps at the boundaries therebetween is formed in said high NA exclusive area, said diffractive lens structure formed in said high NA exclusive area is designed such that the diffraction order where the diffraction efficiency is maximized at the wavelength corresponding to said optical disc having high recording density is different from the diffraction order where the diffraction efficiency is maximized at the wavelength corresponding to said optical disc having low recording density.

8. The objective lens according to claim 7, wherein the diffraction order where the diffraction efficiency is maximized at the wavelength corresponding to said optical disc having high recording density is higher than the diffraction order where the diffraction efficiency is maximized at the wavelength corresponding to said optical disc having low recording density.

9. The objective lens according to claim 8, wherein the diffraction order where the diffraction efficiency is maximized at the wavelength corresponding to said optical disc having high recording density is third order and the diffraction order where the diffraction efficiency is maximized at the wavelength corresponding to said optical disc having low recording density is second order.

10. The objective lens according to claim 7, wherein a diffractive lens structure having a plurality of concentric ring areas with minute steps at the boundaries therebetween is formed in said common area, said diffractive lens structure formed in said common area maximizes the diffraction efficiency of the same order for said light beams of said at least two wavelengths.

11. The objective lens according to claim 7, wherein said common area is formed as a continuous surface without having a diffractive lens structure.

* * * * *

UNITED STATES PATENT AND TRADEMARK OFFICE
CERTIFICATE OF CORRECTION

PATENT NO. : 6,873,590 B2
DATED : March 29, 2005
INVENTOR(S) : S. Takeuchi et al.

It is certified that error appears in the above-identified patent and that said Letters Patent is hereby corrected as shown below:

<u>Title page,</u>
Item [30], Foreign Application Priority Data, should read
-- March 9, 2001      (JP)           2001-67319 --.

Signed and Sealed this

Twenty-third Day of August, 2005

JON W. DUDAS
*Director of the United States Patent and Trademark Office*